US009825932B2

(12) United States Patent
Ponsford et al.

(10) Patent No.: US 9,825,932 B2
(45) Date of Patent: Nov. 21, 2017

(54) STORAGE SYSTEM AND METHOD OF STORING AND MANAGING DATA

(71) Applicant: Qatar Foundation, Doha (QA)

(72) Inventors: Simon Ponsford, Doha (QA); Simon Guerrero, Doha (QA); William Yip, Doha (QA); Gokop Goteng, Doha (QA)

(73) Assignee: Qatar Foundation, Doha (QA)

( * ) Notice: Subject to any disclaimer, the term of this patent is extended or adjusted under 35 U.S.C. 154(b) by 0 days.

(21) Appl. No.: 14/648,139

(22) PCT Filed: Jan. 9, 2013

(86) PCT No.: PCT/EP2013/050306
§ 371 (c)(1),
(2) Date: May 28, 2015

(87) PCT Pub. No.: WO2014/108183
PCT Pub. Date: Jul. 17, 2014

(65) Prior Publication Data
US 2015/0304306 A1    Oct. 22, 2015

(51) Int. Cl.
*G06F 21/62* (2013.01)
*H04L 29/06* (2006.01)

(52) U.S. Cl.
CPC ...... *H04L 63/0807* (2013.01); *G06F 21/6218* (2013.01); *G06F 21/6227* (2013.01);
(Continued)

(58) Field of Classification Search
CPC .................................................. G06F 21/6218
See application file for complete search history.

(56) References Cited

U.S. PATENT DOCUMENTS 7,418,620 B1    8/2008 Tormasov et al.
2003/0188153 A1   10/2003 Demoff et al.
(Continued)

FOREIGN PATENT DOCUMENTS

WO    2008/127309    10/2008

OTHER PUBLICATIONS

Tse et al., "Emerging Issues in Cloud Storage Security: Encryption, Key Management, Data Redundancy, Trust Mechanism", 2014, pp. 297-310.*

*Primary Examiner* — Thaddeus Plecha
(74) *Attorney, Agent, or Firm* — Martin & Ferraro, LLP

(57) ABSTRACT

A system for and method of storing data comprising: encoding a file into a plurality of fragments; retrieving storage configuration data from a data management store including data associated with a plurality of remote storage volumes, the storage configuration data comprising an indication of a predefined data transmission size corresponding to each remote storage volume; using the storage configuration data to identify a storage strategy associating each fragment with a remote storage volume, wherein using the storage configuration data includes using the indications of the pre defined data transmission sizes; packaging one or more fragments each associated with a common identified remote storage volume as identified by the storage strategy to form a data bundle; communicating the data bundle to the respective common identified remote storage volume associated with the fragments in the data bundle; and storing the fragments at that identified remote storage volume.

11 Claims, 3 Drawing Sheets

(52) U.S. Cl.
CPC ........ *G06F 21/6236* (2013.01); *H04L 63/045* (2013.01); *H04L 63/061* (2013.01); *H04L 63/083* (2013.01); *G06F 2221/2107* (2013.01)

(56) References Cited

U.S. PATENT DOCUMENTS

| | | |
|---|---|---|
| 2004/0049700 A1 | 3/2004 | Yoshida |
| 2005/0027892 A1* | 2/2005 | McCabe ............... G06F 3/0626 709/253 |
| 2008/0080718 A1* | 4/2008 | Meijer ................ G06F 21/6245 380/282 |
| 2008/0244257 A1* | 10/2008 | Vaid ..................... H04L 9/0827 713/2 |
| 2010/0088389 A1 | 4/2010 | Buller et al. |
| 2011/0107103 A1 | 5/2011 | Dehaan et al. |
| 2011/0250909 A1 | 10/2011 | Mathias et al. |
| 2011/0289122 A1 | 11/2011 | Grube et al. |
| 2012/0042162 A1* | 2/2012 | Anglin .................... G06F 21/57 713/165 |
| 2012/0047339 A1 | 2/2012 | Decasper et al. |
| 2012/0233522 A1* | 9/2012 | Barton .................... H04L 67/06 714/758 |
| 2013/0074168 A1* | 3/2013 | Hao ...................... H04L 9/3213 726/7 |
| 2014/0068224 A1* | 3/2014 | Fan ....................... G06F 3/0613 711/206 |
| 2015/0312243 A1 | 10/2015 | Ponsford et al. |

\* cited by examiner

STORAGE SYSTEM AND METHOD OF STORING AND MANAGING DATA

This is a National Phase Application under 35 USC 371 of PCT/EP2013/050306 filed Jan. 9, 2013 (published on Jul. 17, 2014 as WO 2014/108183), which is incorporated herein by reference.

The present invention relates to a storage system and to a method for storing and managing data.

There are many reasons for storing data off-site at a location remote from a local system or network. It may be desirable to provide a level of backup or redundancy to rely upon when storing and managing data. It is often necessary to maintain multiple copies of data, preferably in different locations or across physically distinct hardware, in case an event results in irreparable damage to one or more of the copies of the data. In addition, where data is accessible to users spread over a large geographical area, it may be advantageous for data to be made available from multiple storage sites, so as to reduce the physical distance between users and one or more copies of the data.

Maintaining data storage capabilities at multiple locations is expensive and time-consuming. As an alternative, third-parties can be used to provide off-site data storage services. Cloud storage services are one type of off-site data storage service and are available via a wide-area network (WAN). Cloud storage services typically provide storage to users in the form of virtualized pools of storage available via the Internet. In general, users access cloud storage to store and retrieve data using suitable web services protocols.

There are three main models of cloud storage service. Public cloud storage services are hosted by service providers which are accessed via the internet using a published application programming interface (API). This form of storage is suited to organisations which have temporary or varying requirements for data storage, or for which it is not cost-effective to host and manage their own data storage. Private cloud storage services provide a dedicated environment hosted within an organisation's own network. This type of storage suits organisations that have security or access constraints over sensitive data, specific performance and/or structure requirements, or where it is more cost-effective to host and manage data internally. Hybrid cloud storage services combine public and private cloud storage models. An organisation might store 'active' data within a high-speed local area network (LAN) or WAN environment, while archiving older or less frequently used data with a public cloud storage service.

Traditional methods of backing up files rely either on the user taking control of the entire process—identifying and maintaining media, ensuring appropriate off-site storage etc.—or by outsourcing the whole process to a specialised provider. Both of these options have significant downsides in terms of flexibility, reliability and security, and they can both prove costly and/or high-maintenance options.

Saving data to remote storage managed by a third party takes advantage of existing, secure, highly available storage resources around the world which are already being managed by remote storage providers. This removes the need for organisations to manage physical storage mechanisms, while reducing cost by not having to employ a specialised provider.

Cloud storage service providers, for example, manage the operation and maintenance of the physical data storage devices which provide the storage resources of their cloud storage services. Users of cloud storage services can, therefore, avoid the initial and ongoing costs associated with buying and maintaining the physical data storage devices. Cloud storage services typically charge users for consumption of storage resources, such as storage space and/or transfer bandwidth, on a marginal or subscription basis, with little or no upfront costs. In addition to the cost and administrative advantages, cloud storage services often provide dynamically scalable storage resources to meet their users' changing needs. A cloud storage service provider may offer 'availability zones' within its remote storage resources, with the aim of offering low latency and guaranteed connectivity. Transfer of data between availability zones within the same data centre (i.e. within the same facility of the cloud storage service provider) is usually free of charge, so minimizes costs for administering the data stored with the cloud storage service provider. Availability zones are distinct locations that are engineered to be insulated from failures in other availability zones. In this way, data stored in separate availability zones is protected from failure of storage devices at a single location. Cloud storage service providers may also enable control of data storage between storage volumes in separate regions. Regions consist of one or more availability zones, are geographically dispersed, and are in separate geographic areas or countries, thereby enabling a user to specify where the data is stored in a geographical sense.

Remote data storage requirements vary according to the nature of the intended use of the remote data storage. For example, a business backing up data from its network to remote data storage devices (e.g. servers) is likely to place importance on confidential data remaining secure when stored on the remote data storage devices, and on the remote data storage devices providing high resilience storage that is available when it is required.

An online social media portal that is hosting freely-published (and therefore non-confidential) data, or a content-delivery network (CDN), for example, may require cost efficiency and high bandwidth access to any data stored on remote data storage devices, to allow media to be accessed on demand and/or streamed via a website.

Cloud storage service providers tend to separate their services into very distinct usage models to accommodate the varied user requirements. For example, services may be segregated into file backup, virtual drives for online work, and data synchronisation. Because each of these models requires different levels of responsiveness and bandwidth, it is typically impossible to use the same storage interface to store files according to their usage.

Existing cloud storage service providers offer different cost models which allow a user to balance cost and resilience, but these models are not available on a per-file basis. As an organisation's needs change, it may be necessary to purchase varying services (e.g. based on different cost models) from one or more cloud storage service providers. This potentially involves cost and effort in integrating the new services into the existing infrastructure.

It is not generally possible to select, dynamically, the most appropriate level of security for each file to be stored with a cloud storage service. Instead, cloud storage service providers offer a minimum amount of storage capacity at a single level of security. This may mean that an organisation is forced to purchase high-security storage for all their data, or for a minimum amount of storage capacity, even though only a small percentage of files require such a security level.

As a result, it is common for an organisation to purchase remote storage resources of multiple different types, and to impose policies on usage of the storage resources that aim to result in high quality storage resources being used only for high value data. Since the cost of hiring the storage resources of each type may depend on the storage capacity required, this can result in the higher quality storage resources being left redundant, since they are reserved for particular types of data, whilst more lower quality storage resources are used instead. Since there may be no additional cost for using the higher quality storage resources, once they have been subscribed to, this addition usage of the lower quality storage resources is a waste of the total available remote storage resources.

A further problem with current cloud storage services is that, in the absence of a standard for deploying and accessing cloud storage services, each provider has developed its own interface to use its cloud storage services. This makes the problems associated with the transition of an organisation's data to cloud storage significant, not least in terms of the development and configuration costs involved. It may be difficult for an organisation to choose the best provider for long-term use when first starting to use cloud storage services, so it may be necessary to move subsequently to a more appropriate cloud storage service or even to a different cloud storage service provider, again necessitating further development and re-configuration to use the new interface applicable for the new service.

While a degree of choice is offered by some cloud storage service providers in terms of the broad geographical location of the remote storage facilities they provide, users may have more specific requirements for choosing storage locations over the short or long term: ranging from political stability and local legal vulnerabilities, to different charging models or security standards, to geological instability and meteorological events. Providers do not typically offer the ability for a user to specify storage preferences at a per-file level. Where it is possible to do so, users are generally only provided with a limited number of geographical locations.

It may be the case that an organisation has developed a private cloud storage service and has reached the point where it is more cost-effective to outsource some or all of its data storage to a third party. Alternatively, as the cloud storage market expands, the organisation may wish to move from one public cloud storage service provider to another which is more cost-effective or otherwise better suits its needs. Because of the lack of a common storage architecture or interface, such a move will typically involve a large amount of re-configuration, file copying and downtime.

Embodiments of the present invention seek, therefore, to ameliorate one or more problems associated with the prior art.

According to embodiments of the invention, we provide a method of storing data comprising: encoding a file into a plurality of fragments; retrieving storage configuration data from a data management store; retrieving encryption key data from a keystore; identifying a storage strategy using the storage configuration data, the storage strategy associating each fragment with a remote storage volume; and for each fragment: using the encryption key data to identify an encryption key associated with a remote storage volume identified in the storage strategy; encrypting the fragment using the identified encryption key; communicating the encrypted fragment to the associated remote storage volume as identified by the storage strategy; and storing the encrypted fragment at that identified remote storage volume.

Identifying an encryption key, and encrypting, communicating and storing each fragment, may comprise: identifying a plurality of fragments associated with a common remote storage volume in the storage strategy; using the encryption key data to identify an encryption key associated with the common remote storage volume; encrypting the plurality of fragments using the identified encryption key; communicating the encrypted fragments to the associated remote storage volume; and storing the encrypted fragments at that identified remote storage volume.

The method may further include the steps of: authenticating a client device session by: receiving a user identifier and password from a user; and identifying whether the received password matches a password associated with the user stored in the data management store, and if so, identifying whether an identifier associated with the client device matches a client device identifier stored in the data management store; and returning a session token to the client device if the authentication step is successful, and otherwise not returning a session token to the client device.

The method may further include the step of: receiving from a keystore a second encryption key associated with the user; wherein the step of encrypting the fragment using the identified encryption key further comprises encrypting the data fragment using the second encryption key.

The step of identifying a storage strategy using the storage configuration data may comprise identifying a storage strategy using one or more of the following data: total data capacity, used capacity, spare capacity, response speed, provider pricing information, upload transfer size limit, predefined data transmission sizes, bandwidth capacity, volume availability, historical volume availability, advertised data transfer rates, advertised data volume breaks, historical observed data transfer rates, historical volume performance data, historical provider performance data, user-defined volume preferences, geographic location, volume security level and provider security level.

The method may further include the steps of: monitoring the performance of a remote storage volume; communicating performance information to the data management store; and updating the storage configuration data at the data management store.

The method may further include receiving an indication at the storage manager that a fragment has been successfully stored at the remote storage volume.

The step of retrieving from a data management store storage configuration data may include retrieving from the data management store storage plans for storing and reconstituting fragmented files.

The step of encoding a file into a plurality of fragments may comprise first compressing the file.

According to embodiments of the invention, we provide a storage system comprising: a storage manager having a processor and a memory, the storage manager being in communication with a plurality of remote storage volumes, wherein the storage manager has access to a data management store, and is operable to: encode a file into a plurality of fragments; retrieve from the data management store storage configuration data; identify a storage strategy using the storage configuration data, the storage strategy associating each fragment with a remote storage volume; and for each fragment: use the storage configuration data to identify an encryption key associated with a remote storage volume identified in the storage strategy; encrypt the fragment using the identified encryption key; and communicate the encrypted fragment to the associated remote storage volume as identified by the storage strategy.

The system may include a client device operable to transmit files to the storage manager, and operable to initiate storage of the file by the storage manager.

The system may include a data manager store configured to store storage configuration data.

The system may be further operable to compress the file before encoding the file into a plurality of fragments According to embodiments of the invention we provide a method of storing data comprising: encoding a file into a plurality of fragments; retrieving storage configuration data from a data management store including data associated with a plurality of remote storage volumes, the storage configuration data comprising an indication of a predefined data transmission size corresponding to each remote storage volume; using the storage configuration data to identify a storage strategy associating each fragment with a remote storage volume, wherein using the storage configuration data includes using the indications of the predefined data transmission sizes; packaging one or more fragments each associated with a common identified remote storage volume as identified by the storage strategy to form a data bundle; communicating the data bundle to the respective common identified remote storage volume associated with the fragments in the data bundle; and storing the fragments at that identified remote storage volume.

The method may further include the step of encrypting each fragment using an encryption key.

The method may further include the step of: authenticating a client device session by: receiving a user identifier and password from a user; and identifying whether the received password matches a password associated with the user stored in the data management store, and if so, identifying whether an identifier associated with the client device matches a client device identifier stored in the data management store; and returning a session token to the client device if the authentication step is successful, and otherwise not returning a session token to the client device.

The method may further include the steps of, before encrypting each fragment: retrieving encryption key data from a keystore; and using the encryption key data to identify an encryption key associated with the remote storage volume identified in the storage strategy.

The method may further include the steps of, before encrypting each fragment: retrieving encryption key data from a keystore; and using the encryption key data to identify an encryption key associated with the user.

The step of encrypting each fragment using an encryption key may comprise: retrieving encryption key data from a keystore; using the encryption key data to identify a first encryption key associated with the user; encrypting the fragment using the first encryption key; using the encryption key data to identify a second encryption key associated with the remote storage volume identified in the storage strategy; and encrypting the fragment using the second encryption key.

The step of encrypting each fragment using an encryption key may occur before the step of packaging one or more fragments to form a data bundle.

The step of encrypting each fragment using an encryption key may occur after the step of packaging one or more fragments to form a data bundle, such that the bundled data is encrypted.

The step of encrypting the fragment using the first encryption key may occur before the step of packaging one or more fragments to form a data bundle, and the step of encrypting the fragment using the second encryption key occurs after the step of packaging one or more fragments to form a data bundle, such that the bundled data is encrypted using the second encryption key.

The step of identifying a storage strategy using the storage configuration data may comprise identifying a storage strategy using one or more of the following data: total data capacity, used capacity, spare capacity, response speed, provider pricing information, upload transfer size limit, predefined data transmission sizes, bandwidth capacity, volume availability, historical volume availability, advertised data transfer rates, advertised data volume breaks, historical observed data transfer rates, historical volume performance data, historical provider performance data, user-defined volume preferences, geographic location, volume security level and provider security level.

The method may further include the steps of: monitoring the performance of a remote storage volume; communicating performance information to the data management store; and updating the storage configuration data at the data management store.

The method may further include receiving an indication at the storage manager that a data bundle has been successfully stored at the remote storage volume.

The step of retrieving from a data management store storage configuration data may include retrieving from the data management store storage plans for storing and reconstituting fragmented files.

The step of encoding a file into a plurality of fragments may comprise first compressing the file.

According to embodiments of the invention we provide a storage system comprising: a storage manager having a processor and a memory, the storage manager having access to a data management store storing storage configuration data and a keystore storing encryption keys, and is operable to: encode a file into a plurality of fragments; retrieve storage configuration data from a data management store including data associated with a plurality of remote storage volumes, the storage configuration data comprising an indication of a predefined data transmission size corresponding to each remote storage volume; use the storage configuration data to identify a storage strategy associating each fragment with a remote storage volume, wherein using the storage configuration data includes using the indications of the predefined data transmission sizes; package one or more fragments each associated with a common identified remote storage volume as identified by the storage strategy to form a data bundle; and communicate the data bundle to the respective common identified remote storage volume associated with the fragments in the data bundle.

The system may further include a client device operable to transmit files to the storage manager, and operable to initiate storage of the file by the storage manager.

The system may further include a data manager store configured to store storage configuration data.

The system may further include a keystore in communication with the storage manager, wherein the keystore has no direct communication with the data manager store.

The system may be further operable to compress the file before encoding the file into a plurality of fragments.

BRIEF DESCRIPTION OF THE DRAWINGS

Embodiments of the invention will now be described, by way of example only, and with reference to the accompanying drawings, in which.

DETAILED DESCRIPTION

Figure 1:
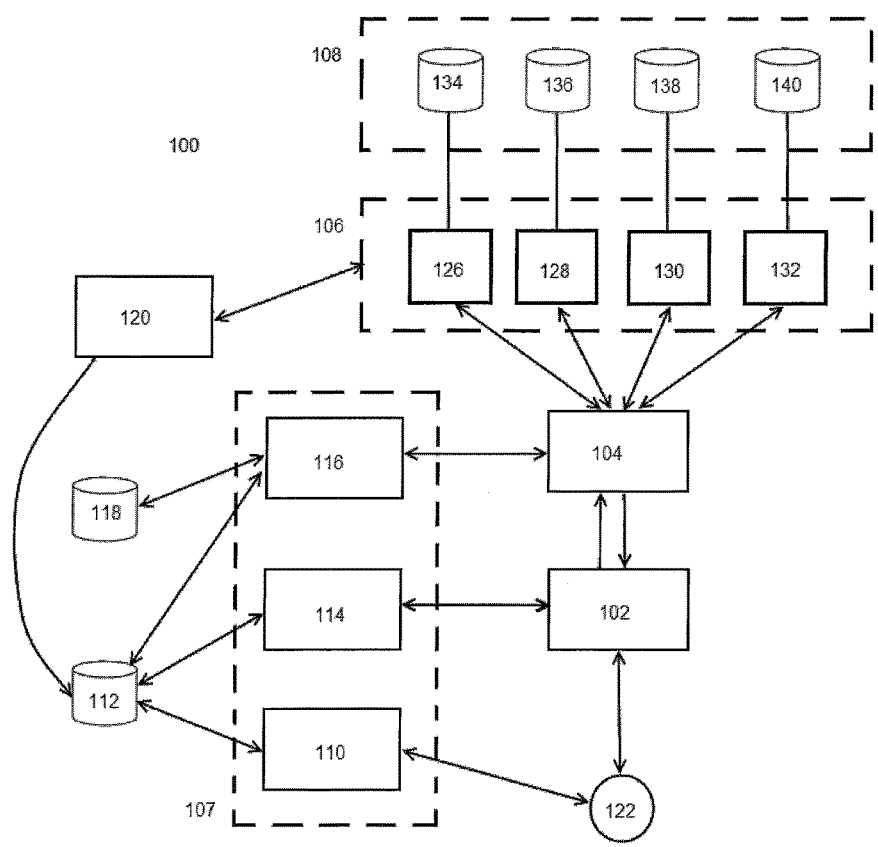
FIG. 1 is a schematic block diagram of a system according to embodiments of the invention.

It is envisaged that the modules and components described herein may be combined in any manner. The modules may be executed on a single network device, for example, or any number of the modules may be located on devices connected via a network, or the like. Components of the system may be combined within a single device, or may be provided remote from one another.

A storage system 100 according to embodiments of the present invention is now described with reference to FIG. 1 of the drawings. A client device 102 is provided, on which one or more applications such as a client system 'tray application' may be installed—generally referred to herein as 'client software'.

The client device 102 stores one or more local files which are to be copied or transferred to remote storage one or more providers 108. The client device 102 may also form part of a network of devices (as seen in the example shown in FIG. 2), wherein the client device 102 may initiate remote storage of one or more files hosted on other devices that are accessible via the network.

One or more applications hosted on the client device 102 may handle scheduled backups, and/or manually-initiated remote storage requests, and/or setting of user preferences. In an example, integrated "right-click" context menus can provide a user with access to backup and restore operations directly from the desktop and/or other applications operating on the client device 102.

User Administration

The client device 102, or a separate device, is provided with an interface for accessing modules within a data management layer 107 of the storage system 100. An administration module 110 of the data management layer 107 may permit a user to access one or more files, via the client device 102 (which may be a different client device 102 from that originally used to back-up or archive the or each file, for example).

The user may control aspects of the storage system 100 through a web interface 122, for example, either via the client device 102 or remotely via the separate device through a web browser, connecting to a web server hosted on a server of the storage system 100 (which may be an administration server or server cluster of the storage system 100).

In the case of the client device 102, or the separate device, comprising a mobile device, for example, a web browser or a locally installed application such as a mobile app can be provided as part of the web interface 122.

The user may interact with the data management layer 107 so as to administer changes to the configuration of the storage system 100 (via the administration module 110), and to authenticate one or more user access session (via an authentication module 114 of the data management layer 107) to allow the user to operate the storage system 100 using the one or more applications hosted on the client device 102, so as to send and/or retrieve data from remote storage providers 108.

Authentication

Typically, when accessing the storage system 100, the client device 102 communicates with the authentication module 114 to connect with a data management store 112.

In embodiments, the administration module 110 and authentication module 114 may be combined, such that the administration module 110 is accessible directly via the client device 102.

The authentication module 114 may be configured to receive a user identifier and a password, and compare the password (which may be a password input by the user) with a corresponding password stored in the data management store 112 (the password may be associated with the user identifier). Additionally, the authentication module 114 may be configured to receive a device identifier from the client device 102 (such as a MAC address, an IP address, or the like, which is associated with the client device 102, or a combination of such identifiers) to compare with one or more stored device identifiers in an 'allowed' list, to ascertain whether the client device 102 is permitted to access the data management store 112.

If the user is validated by the authentication module 114, a session token is returned to the client device 102 from the authentication module 114, or other component of the data management layer 107, which may have a fixed validity period and which may be needed for all communications between the client device 102 and a storage manager 104 of the storage system 100. In embodiments, both the user and the client device 102 must be validated by the authentication module 114.

Data Management Store

The data management store 112 may store administration data accessible via the administration module 110 (such as user account ID, email, password, name, address, public key for login, key pair for encryption, last login, account schedule, billing details, and preferences including remote storage volume preferences, access and security preferences, web-based application settings and preferences, user file details, file fragment breakdown, location of individual file fragments, timestamps, versions) and authentication data accessible via the authentication module 114 (such as user credentials including user identifiers and user passwords, device identifiers (which may be registered device identifiers), session information including session tokens, active file operations, login time and so on).

The data management store 112 may also store storage configuration data (also referred to herein as a configuration database), including details of the remote storage providers 108, and individual remote storage volumes 134, 136, 138, 140.

The storage configuration data may include details of each of the remote storage volumes 134, 136, 138, 140 and/or remote storage providers 108, such as: total data capacity, used capacity, spare capacity, response speed, provider pricing information, upload transfer size limit, predefined data transmission sizes (i.e. defining preferred data transmissions sizes), bandwidth capacity, volume availability (i.e. whether the storage volume is accessible), historical volume availability (uptime percentage), advertised data transfer rates (i.e. upload and download rates), advertised data volume breaks (e.g. in relation to a tiered storage system in which a surcharge may be applied when a data volume threshold is exceeded), historical observed data transfer rates, historical volume performance data, historical provider performance data, user-defined volume preferences, geographic location, volume/provider security level, addressing/access details, API type, volume/provider encryption type, and/or encryption keys. It should be understood that this list is by no means intended to be an exhaustive list of data types, but provides a set of examples only.

The data management store 112 may also hold infrastructure information, regarding storage plans needed to store and reconstitute files which have been encrypted and fragmented across multiple remote storage volumes 134, 136, 138, 140 and/or remote storage providers 108. This information may be provided to the storage manager 104 via a configuration module 116 of the data management layer 107, once storage strategies have been devised for the transmission of files and/or fragments. For example, storage plans for storing and reconstituting fragmented files may include plans of where file fragments are stored on remote storage volumes 134, 136, 138, 140, so that a file can be reconstituted by retrieving the fragments from those recorded locations and combining the fragments (as will become apparent from the discussion below).

Keystore

Keystore data including private keys used to encrypt and decrypt data sent to, and retrieved from, the remote storage providers 108 may be stored in a keystore 118. Keystore 118 may be provided separately from the data management store 112, or may be stored in the data management store 112 (forming part of the configuration database, for example).

The keystore 118 may be accessible via the configuration module 116, for providing the private keys to the storage manager 104. Storing the keys at a separate, and potentially remote, location from the data management store 112 is beneficial, as it provides an additional layer of security, should the security of the data management store 112 be compromised.

Storage Manager

As indicated above, the storage system 100 further comprises the storage manager 104. The storage manager 104 may be configured to co-ordinate authentication of client devices and/or user credentials, storage and retrieval of files. In examples, the storage manager 104 may monitor the performance of the system 100, and may adapt storage and retrieval strategies accordingly. The storage manager 104 is configured to communicate with the storage strategy configuration module 116 provided within the data management layer 107, to access storage configuration data stored in the data manager store 112.

The storage strategy configuration module 116 is configured to provide information regarding the status and availability of the remote storage volumes 134, 136, 138, 140, and to use storage configuration data to identify a storage strategy, wherein the storage strategy associates data to be uploaded with particular remote storage volumes 134, 136, 138, 140 and/or remote storage providers 108 based on user-defined preferences and storage performance data, for example. In this way, data is allocated to the most suitable remote storage volumes 134, 136, 138, 140 and/or remote storage provider 108 based on particular properties of the data.

In embodiments, the storage strategy configuration module 116 is configured to validate every request (received from the client device 102 via the storage manager 104) by checking that the session token provided by the client device 102 is valid—an invalid session token results in rejection of the associated request. The strategy configuration module 116 also communicates with the keystore 118 to obtain key pairs for the encryption and decryption of file and/or fragment data.

It should be understood that each component of the storage system 100—such as the storage manager 104, keystore 118, data management layer 107 modules 110, 114, 116 and monitoring module 120, and data management store 112—are location-agnostic, and each can either run as a single instance or clustered behind a virtual network IP address to provide a single point of communication with these elements of the storage system 100 from external sources/devices.

The data management store 112 may be a single storage device, providing database storage holding system and storage information. Alternatively, the data management store 112 may comprise a clustered database provided across multiple storage volumes, which may be housed within a single device, or may be distributed across a network, for example.

The client device 102, and applications provided thereon (as described in more detail below) may be location-specific, in that the IP address and/or other geographical location of the client device 102 may be taken into account in the context of the determination of which remote storage provider(s) 108 to use.

Components of the storage system 100 may share servers, or occupy their own server, as they communicate with each other via encrypted socket connections (for example, https port 443). Depending on the particular deployment model adopted, the components may reside on an organisation's LAN or WAN, or on a remote network via the Internet.

File Fragmentation

The storage system 100 is configured to fragment a file before it is stored in one or more of the remote storage volumes 134, 136, 138, 140 and/or with one or more of the remote storage providers 108.

This enables the storage system 100 to backup or archive data across multiple remote storage volumes 134, 136, 138, 140 which may be geographically and/or physically remote from each other.

In a cloud storage environments, this enables multiple cloud storage sites to store fragments of the same file (each site having one or more associated remote storage volumes 134, 136, 138, 140 and each site potentially being remote from one or more others of the sites).

In embodiments, one or more of the same fragments are replicated across a plurality of remote storage volumes 134, 136, 138, 140 so that the loss of one remote storage volume 134, 136, 138, 140 can be mitigated by retrieving a copy of the one or more fragments from another remote storage volume 134, 136, 138, 140. This is useful where, for instance, most files are backed-up or archived to a first filestore (which may be a local filestore in the form of one or more local storage volumes or one or more first remote storage volumes 134, 136, 138, 140) with occasional use of a higher-cost and/or higher-reliability remote storage provider 108 and/or remote storage volume 134, 136, 138, 140 for additional copies of the most important files.

Fragmentation of files also enables, in some embodiments, the separate fragments of a file to be stored in locations remote from one another, so that if security of one storage location is compromised, the file cannot be reconstructed since the other fragments remain secure.

Storage Strategies

In general terms, the storage manager 104 is configured to encode a file received from the client device 102 into a plurality of fragments. The storage manager 104 is also configured then to retrieve storage configuration data from the data management store 112, via the storage strategy configuration module 116.

The storage manager 104, using the storage strategy configuration module 116, is operable to identify a storage strategy using the storage configuration data, the storage strategy associating each fragment with a respective remote storage volume 134, 136, 138, 140 and/or remote storage provider 108. Then, for each fragment, the storage manager 104 (and storage strategy configuration module 116) is configured to use the storage configuration data to identify an encryption key associated with the remote storage volume 134, 136, 138, 140 and/or remote storage provider 108 identified in the storage strategy (the encryption key may also be associated with a user and/or client device 102).

In other words, the storage manager 104 identifies a strategy for allocating fragments to the remote storage volumes 134, 136, 138, 140 and/or remote storage providers 108. Each fragment is encrypted using the identified encryption key, and then communicated to the associated remote storage volume 134, 136, 138, 140 and/or remote storage provider 108 by the storage manager 104. Each fragment is then stored, still in its encrypted form, at the relevant remote storage volume 134, 136, 138, 140 and/or remote storage provider 108.

It should be understood that the steps of associating each fragment with a remote storage volume 134, 136, 138, 140 and/or remote storage provider 108, encrypting the fragments and sending the fragments, may be performed in a different order. For example, the storage strategy may be identified for all fragments before any of the fragments is encrypted, or each may be encrypted and sent before identifying a strategy for the next fragment. Alternatively, once the target remote storage volumes 134, 136, 138, 140 and/or remote storage providers 108 have been identified, multiple fragments may be combined into a bundle to be encrypted and sent together.

One or more files selected at the client device 102 for storage may be fragmented by the client device 102 before being uploaded to the storage manager 104. Alternatively, the or each file may be uploaded to the storage manager 104 before being fragmented by the storage manager 104.

The fragmentation of a file by the storage manager 104 may involve retrieving data indicative of predefined data transmission sizes, or other storage configuration data or user-defined preferences, from the data manager store 112, to determine appropriate fragment sizes.

As will be appreciated, in embodiments, two or more fragments of the same file may be stored on different remote storage volumes 134, 136, 138, 140 and/or with different remote storage providers 108.

Distributed File Storage

In example uses of the storage system 100, fragments making up a file can be written across a number of remote storage volumes 134, 136, 138, 140 and, potentially using a number of remote storage providers 108, using, for example, a RAID 5 pattern, allowing for the failure of one or more of the remote storage volumes 134, 136, 138, 140 (and/or entire remote storage providers 108). This is useful where all the remote storage volumes 134, 136, 138, 140 (and/or remote storage providers 108) can be categorised in terms of having roughly equal levels of reliability, but comes at a cost of an increase in fragment size.

As indicated above, a file may reside in multiple fragments across multiple different remote storage volumes 134, 136, 138, 140 which may be provided by a plurality of different remote storage providers 108 (and which may be over a plurality of remote servers). In this way, multiple remote storage providers 108 (which may be providers of cloud storage) can be used to store a distributed, encrypted file system. This allows a file system to move between the remote storage volumes 134, 136, 138, 140 (e.g. 'the cloud') and the client device 102 (e.g. a user's device) through a process of backing up/archiving and/or restoring files (which may have been changed during a login session for the client device 102).

In embodiments, none of the fragments are individually identifiable as being part of any particular file without the use of the storage manager 104. Furthermore, in embodiments, each of these fragments may only be decrypted using a private key (e.g. associated with the user who originally backed the file up or archived the file). This key may be stored within the data management store 112 and is not, in embodiments, available externally. Alternatively or in addition, one or more private keys may be stored in the keystore 118.

Encryption Types

Where different remote storage volumes 134, 136, 138, 140 are used that are hosted by the same remote storage provider 108, or different remote storage providers 108 are used, separate private keys may be used for encrypting the communications between the storage manager 104 and each of the different remote storage volumes 134, 136, 138, 140 and/or between the storage manager 104 and each of the different remote storage providers 108 (if applicable).

For file fragment storage, each user may have a public-private key pair generated at the time the user was registered with the storage system 100 and/or a particular remote storage provider 108. Both halves of the public-private key pair may be accessible by the storage manager 104, via the configuration module 116.

Whenever the storage manager 104 receives a file fragment from a client device 102, it may be configured to encrypt the file fragment using the public half of the public-private key pair and then (in embodiments) compress the encrypted file fragment prior to transmission to the remote storage volume 134, 136, 138, 140. Likewise, when an encrypted fragment of a file is retrieved from a remote storage volume 134, 136, 138, 140, the storage manager 104 may be configured to decrypt the encrypted file fragment using the private half of the public-private key pair and decompress the decrypted file fragment, prior to transmitting the decrypted and decompressed file fragment to the client device 102.

Communication of data (e.g. file fragments) from the client device 102 to the remote storage volumes 134, 136, 138, 140 may be encrypted and authenticated as appropriate. In addition, the data itself (e.g. file fragments) may be encrypted independently prior to transmission to the remote storage volumes 134, 136, 138, 140.

In an example, all communication channels of the storage system 100 are encrypted, not just those between the storage manager 104 and the remote storage providers 108/remote storage volumes 134, 136, 138, 140.

A communication channel between the client device 102 and the storage manager 104 may be encrypted passively (such as by virtue of using secure HTTP for example), while a communication channel between the storage manager 104 and the remote storage volumes 134, 136, 138, 140/remote storage providers 108 may be 'double-encrypted'. Firstly, this communication channel may be encrypted using a private key corresponding to the particular user (and potentially also to the remote storage volume 134, 136, 138, 140 (or remote storage provider 108)). Secondly, the communication channel may also be encrypted by virtue of the transmission mechanism between the storage manager 104 and the client device 102 (again, such as using web services over secure HTTP for example). This helps to ensure the integrity of the data against intrusion at, as well as substantially preventing packet sniffers en route from deciphering the content of the fragment.

All data sent from a client device 102 to the storage manager 104 may be marked with a unique session number and/or a name of the user's system (e.g. a device identifier for the client device 102), and may be authenticated by the storage manager 104 before it is accepted—this may be independently of, or instead of, or as an example implementation of, the token-based arrangement discussed above).

Substantially all web service traffic between the client software and the storage manager 104 may be encrypted with SSL (Shared Sockets Layer) 128-bit encryption or some other suitable form of encryption.

In embodiments, all communication sessions between the storage manager 104 and a remote storage volume 134, 136, 138, 140 accessed via a Custom Storage Agent may be authenticated using a public-private key pair (the storage manager 104 initiating all communication and sending its private key). The Custom Storage Agent is, in embodiments, based on a small web browser, offering web services which are all accessed over secure HTTP, again encrypted with 128-bit SSL encryption (for example). For storage accessed via providers' standard APIs, remote storage provider's 108 encryption and authentication may be used to achieve similar levels of security.

As a result of these encryption techniques, the reading of data from one or more remote storage providers 108 and/or remote storage volumes 134, 136, 138, 140, without using the storage manager 104 to decrypt and decompress the data, is substantially prevented or restricted. On receiving encrypted file fragments from the remote service providers 108, the storage manager 104 first decrypts the file fragments using the private key particular to the service provider 108 from which the respective file fragment was received. The data may then be decrypted using a key associated with the user (or client device 102), to whom the data belongs or from which the data originated. This may be followed by merging of fragments and then decompression, to reconstitute the original file.

Remote Storage Communication Layer

In storage systems 100 in which a selection of different remote storage providers 108 are used, it is advantageous to provide a remote storage communication layer 106.

Since the remote storage volumes 134, 136, 138, 140 may be hosted by different remote storage providers 108, each remote storage volume 134, 136, 138, 140 may implement a different API (it will be understood that one remote storage provider 108 may have more than one remote storage volume 134, 136, 138, 140 associated therewith using a common API but that this API may also be different from an API associated with another remote storage provider 108 and/or another remote storage volume 134, 136, 138, 140).

An embodiment of the system 100 includes a remote storage communication layer 106, through which the storage manager 104 communicates with the or each remote storage provider 108. To address the issue of requiring multiple protocols for communicating with different APIs, separate communication modules 126, 128, 130, 132 are provided. Each communication module 126, 128, 130, 132 is configured to provide an API appropriate to a corresponding remote storage provider 108 and/or remote storage volume 134, 136, 138, 140. An alternative configuration could be a single communications module, or 'expert agent module', with knowledge of multiple APIs to be able to communicate with remote storage volumes 134, 136, 138, 140.

Each communication module 126, 128, 130, 132 may be configured to receive one or more communications in a standardised format from the storage manager 104, and each may be configured to communicate with a respective one (or more, in examples) of the remote storage providers 108 and/or one or more of the remote storage volumes 134, 136, 138, 140.

The remote storage communication layer 106 acts as a generic or universal interface to all the potentially different kinds of remote storage volume 134, 136, 138, 140 used within the storage system 100 (e.g. within the co-ordinated cloud storage architecture), and in this way, the storage manager 104 may communicate with each of the remote storage providers 108 and/or remote storage volumes 134, 136, 138, 140 using only a single standard protocol (or a group of standard protocols), via the remote storage communication layer 106 (even if that single standard protocol or group of standard protocols is not supported by the remote storage providers 108 and/or remote storage volumes 134, 136, 138, 140).

The remote storage communication layer 106 may be provided by a single component, or a single Expert agent module, which stores and operates with the appropriate communication modules 126, 128, 130, 132. Each remote storage provider 108 may supply its own communication module 126, 128, 130, 132, which is configured to provide an API suitable for communicating with its respective remote storage volumes 134, 136, 138, 140. The remote storage communication layer 106 accepts file fragment store or retrieve requests from the storage manager 104 (requests which may have been initiated by the client device 102) and uses an appropriate API interface to carry out the required action in relation to the appropriate remote storage volume 134, 136, 138, 140. The remote storage communication layer 106 may also provide information on the health and capacity of one or more of the remote storage volumes 134, 136, 138, 140 to the monitoring module 120.

The remote storage communication layer 106 may be provided as a separate, component remote from the storage manager 104. The remote storage communication layer 106 may be implemented within a LAN of the organisation operating the one or more elements of the storage system 100 (e.g. the remote storage provider 108 or an operator of the client device 102), including the storage manager 104, or may be a component of the device or cluster comprising the storage manager 104, for example.

Cloud storage providers or other remote storage providers 108 may provide communication modules 126, 128, 130, 132 that are managed by the remote storage provider 108 and accessed via web service calls as specified by the provider. Seemingly generic storage may be provided through a custom storage agent which can be installed on either a physical or virtual server and which has access to one or more remote storage volumes 134, 136, 138, 140, and communicates with the storage manager 104 through a web service interface for example.

Fragment Aggregation

In embodiments, data to be transmitted from the storage manager 104 is first compressed and then fragmented.

Fragments may be aggregated (grouped) for a single remote storage provider 108 and/or a single remote storage volume 134, 136, 138, 140 into optimum data transmission sizes according to a parameter associated with the remote storage provider 108 and/or remote storage volume 134, 136, 138, 140 to which the data is to be sent. This minimises the number of individual transmissions (i.e. "PUT" jobs), which may each incur a charge (i.e. per transmission)—the volume of data stored may or may not be charged separately. The parameter associated with the remote storage provider 108 and/or remote storage volume 134, 136, 138, 140 may be an optimum network packet size for data transmissions to the provider 108 or volume 134, 136, 138, 140. An optimum network packet size for transmission may be known for each provider 108 and/or volume 134, 136, 138, 140. This information may be stored in the data management store 112.

The data management store 112 may also include other settings (i.e. requirements) for the sending and receiving of data to and from each remote storage provider 108 and/or remote storage volume 134, 136, 138, 140. These other settings may include settings which depend on the client network technologies used (e.g. UTMS (3G), LTE, ADSL).

For example, at time of writing, with a 3G cellular network using Amazon S3 storage the packet size should be 32K with a delay between packets, but with no delay if sending over a wired or more reliable/faster wireless network connection to achieve the highest transfer success rate.

In this way, the storage manager 104 may retrieve from the data management store 112 storage configuration data comprising an indication of a predefined data transmission size corresponding to the or each remote storage volume 134, 136, 138, 140.

The storage manager 104 and storage strategy configuration module 116 may then use that information to identify a storage strategy that associates each fragment with a particular one of the remote storage volumes 134, 136, 138, 140. The storage strategy may be identified, in part, based on the optimum network packet size for data transmissions to each provider 108 and/or volume 134, 136, 138, 140.

Multiple file fragments may be aggregated and packaged together into one or more data bundles (or packets), wherein the fragments in a data bundle are all to be sent to a common remote storage volume 134, 136, 138, 140 or provider 108. In this way, the storage strategy may be selected so that fragments are bundled together up to, or just below, the optimum network packet size for data transmissions to the provider 108 and/or volume 134, 136, 138, 140. The data bundle of fragments may then be communicated to the remote storage volume 134, 136, 138, 140 or provider 108.

Monitoring Module

An additional service performed by the remote storage communication layer 106 is to provide performance data as feedback via a monitoring module 120 to the data management store 112.

The monitoring module 120 sends requests to and receives data from the communication modules 126, 128, 130, 132 to obtain information about the status (and properties of) the remote storage providers 108 and/or remote storage volumes 134, 136, 138, 140 associated therewith. This information may include response times, and/or uptime, and/or remaining capacity, and the like. This performance information is then communicated to the data management store 112 and may be stored in the data management store 112 to be used by the storage strategy configuration module 116 in the preparation of storage and retrieval plans.

Latency Policies

The storage manager 104 may implement a latency policy whereby delays for transmission of data to the remote storage providers 108 is minimised. A latency algorithm sets a timeout limit, according to the latency performance of each remote storage provider 108 (details of which may be stored in the data management store 112, and accessed by the storage manager 104 via the storage strategy configuration module 116). When a timeout limit is reached for receiving a response to retrieve a file or file fragment, the storage manager 104 selects whether to reconstitute the file, or relevant fragment, from alternative copies stored with other service providers 108 (and/or on other remote storage volumes 134, 136, 138, 140), or to retry sending the retrieve request a specified number of times to the same remote storage provider 108 and/or remote storage volume 134, 136, 138, 140.

A similar strategy may be employed when attempting to send data to a provider 108 or volume 134, 136, 138, 140, whereby the data may be sent elsewhere if no report of successful receipt and storage is received from the provider 108 and/or the volume 134, 136, 138, 140. The known latency of each provider 108 and/or volume 134, 136, 138, 140 may also be used to assess network performance to each remote storage provider 108 and/or remote storage volume 134, 136, 138, 140. The storage system 100 may adapt so that if a latency threshold is reached, a spare preconfigured remote storage provider 108 and/or remote storage volume 134, 136, 138, 140 may be used instead.

From a storage perspective, the storage system 100 according to an example is scalable simply by adding more remote storage volumes 134, 136, 138, 140 and/or further remote storage providers 108.

Resilience of the remote storage may be achieved by storing multiple copies of each file fragment (subject to the user's service level). Both the storage manager 104 and the data management store 112 can be clustered using industry-standard Linux High Availability and MySQL clustering, in embodiments. In embodiments, a load balancer can be used to direct traffic to the least used remote storage volume 134, 136, 138, 140 or remote service provider 108. Cloud storage vendors may use embodiments of the invention to implement scalable storage systems 100.

Client Software

Client software operates on the client device 102. In embodiments, the client software enables tightly-integrated backup and recovery functionality from context menus on a client device 102.

The client device 102 may be a desktop computer, laptop or mobile device such as a mobile station or tablet device for example.

During an installation process for the client software, a username and password and/or private key associated with the user may be used to authenticate (via authentication module 114) with the storage manager 104 and to authorise the client device 102 on which the client software is being installed.

This causes the client device 102 to be added to a list of authorised systems at the storage manager 104. If the client device 102 is lost, stolen or otherwise rendered inaccessible at any point in the future, the administration module 110, via an administration interface, can be used to replace the client device 102 in the list of authorised systems with a new client device 102: allowing recovery of one or more files associated with the original client device 102 and continuation of service. Each client device 102 may be identified in the list of authorised systems by an identifier and may be associated in the list of authorised systems with one or more users.

Once the client software is installed on a client device 102 and that device 102 has been registered with the storage manager 104, backup/archive functionality is made available via system context menus, for example.

Example Systems

Example systems and methods according to embodiments of the invention may provide the ability to recover the last version of one or more files backed-up to a remote storage volume 134, 136, 138, 140 using a single operation. This may be useful in the event of the loss of a particular client device 102;

also, because files can be fragmented across multiple remote storage volumes 134, 136, 138, 140 and/or remote storage providers 108, a backup/archive or restoration request can be parallelised to minimise operation time.

In addition to functionality integrated into a client device 102 (such as a desktop for example) through the client software, a browser-based interface can in embodiments permit full access to the same functionality, including saving and restoring file versions, registering and de-registering client devices 102 (for example, in the case of loss or theft of a client device 102) and so on.

It should be understood that the following examples of a backup system provided using an embodiment of a storage system 100 of the invention are merely illustrative of embodiments of the invention and may not include all of the features described above.

Figure 2:
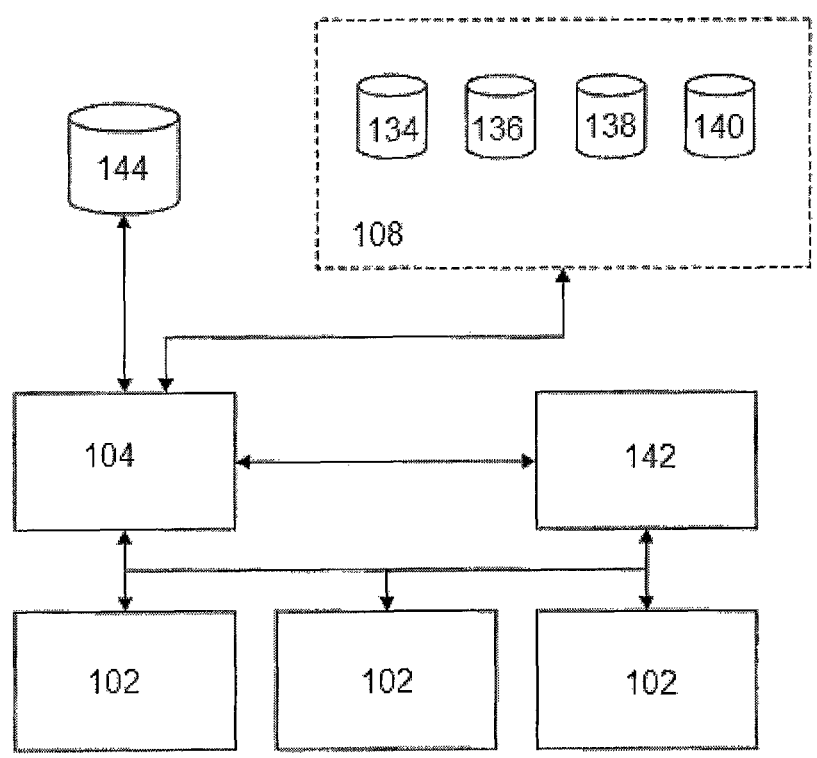
FIG. 2 is a schematic block diagram of a system according to further embodiments of the invention.

The following example system, described with reference to FIG. 2, is intended to demonstrate an implementation of a system according to the an embodiment of the present invention. In the example of FIG. 2, a storage manager 104 has access to a number of remote storage providers 108 which may be cloud storage data centres; the storage manager 104 may also have access to an internal data centre of an organisation and internally available disk storage.

Multiple client system devices 102 are communicatively coupled to an administration server 142 and the storage manager 104. Each client device 102 can, for example, send and receive data over the Internet using a wired or wireless link. Each client device 102 can send and receive data to and from the administration server 142 and storage manager 104 using a secure link (or links) such as HTTPS for example. The storage manager 104, which can be a server which is remote from and/or physically distinct from administration server 142, is communicatively coupled to a set of cloud storage devices or other form of remote storage volume 134, 136, 138, 140. The cloud storage devices can include multiple storage devices provided by third parties and which are accessible via an API of a remote storage provider 108 for example. In an example, network storage 144 can be included and may be operable to receive a fragment of a file for backup from a client device 102.

In an example, in order to backup a file, a user must first be registered with the data management store 112 (see FIG. 1, for example). Typically, each user is associated with a Service Level, which defines the level of resilience available to them (such as how many copies of each backup will be made for example) and the total amount of storage resources which is available to them. Client software (for example, in the form of a tray application and context menu functions) is provided on the client device 102, via web browser using the web interface 122 (served by the administration server 142). In an example, a user can install such software.

Each user is allocated at least one substantially unique public-private key pair which is used by the storage manager 104 to encrypt and decrypt file fragments as they move to and from the remote storage volumes 134, 136, 138, 140. This ensures that anyone able to access an individual file fragment on a particular volume 134, 136, 138, 140 cannot decrypt the fragment without the private key, and the storage of the key in the configuration database (or keystore 118 if provided) means that there is no risk of it being lost by an end user.

In other embodiments, different unique key pairs may be allocated in relation to each remote storage provider 108 and/or in relation to each remote storage volume 134, 136, 138, 140, such that data sent to each provider 108 and/or volume 134, 136, 138, 140 receives a different encryption. In this way data security is enhanced, as in the event that one of the key pairs is compromised, only the data fragments stored on the remote storage provider 108 or remote storage volume 134, 136, 138, 140 for which that key pair is used are compromised. In the event that files have been fragmented, and the fragments from a file have been distributed between multiple remote storage providers 108 and/or remote storage volumes 134, 136, 138, 140, the ability to decrypt only a portion of the fragments stored with the compromised provider 108 and/or volume 134, 136, 138, 140 does not enable the file to be reconstructed.

In an example, to back up a file, the user may right-click on the file and select "Backup" (or similar) from a context menu. If a session token does not exist locally on the client machine 102 (i.e. the user/machine combination has not been authenticated), the user will be prompted for his or her username and optionally, a password (depending on whether or not a key is being used). The client software will then authenticate against the storage manager 104 using a web service call, for example. If authentication fails, the user is prompted again. Otherwise, the user is authenticated for the current session and a session token is stored locally in the client device 102. In an example, should the user have elected to use a public-private key pair for authentication against the storage manager 104, this will be a different key from that used by the storage manager 104 to encrypt and decrypt file fragments.

In an example, the client software creates a temporary, compressed version of the file selected or identified to be backed-up. The client software then calls a web service on the storage manager 104, passing in a backup request along with details such as the file size. Subject to sufficient remote storage capacity, the storage manager 104 determines the user's preferences in a configuration database and builds up a list of a number of remote storage providers 108 and/or remote storage volumes 134, 136, 138, 140, along with details of offsets and sizes of file fragments to be stored with those providers 108 and/or on those volumes 134, 146, 138, 140. This information is stored in the configuration database as a File Transfer Session object, identified by the identity of the client device 102, the identity if the user (e.g. a username) and file path and a file version. The storage manager 104 responds to the client software providing details of the providers 108 and/or volumes 134, 136, 138, 140 allocated for storage and the size and offset of each of the required fragments.

In an example, the client software spawns a number of child threads, each one to transmit a fragment of the file (up to a pre-defined limit). This allows simultaneous transmission of multiple fragments of each file without waiting for the ultimate success or failure to store one fragment before the others can be sent. Each thread can call a web service on the storage manager 104, for sending the storage manager 104 a file fragment along with a checksum of the compressed data, such as a SHA-1 checksum.

The storage manager 104 may validate the checksum and identify the remote storage provider 108 and/or remote storage volume 134, 136, 138, 140 to which the fragment should be sent. It then encrypts the fragment using the user's public key from the configuration database (or keystore 118 is provided), and sends the encrypted fragment to the appropriate remote storage provider 108 and/or remote storage volume 134, 136, 138, 140 (in the case where a custom storage agent is used, another checksum can also be sent for subsequent verification by the storage agent). When the fragment has been stored successfully with the appropriate provider 108 and/or location 134, 136, 138, 140, the details of the file and its fragments may be stored in the configuration database (i.e. at the data management store 112), and a success response is returned to the client device 102 for the appropriate fragment.

The client device 102 carries on transmitting each fragment (opening additional threads if appropriate), until all are complete. During the process, the multi-threaded nature of the process means that progress can be indicated to the user in a small window, showing how much of each fragment has been stored. If a failure occurs at any point in the process (for instance, in the case of a checksum being invalid), a number of retries may occur, with the client device 102 re-sending data if appropriate. After retries have exceeded a threshold value, a critical failure is returned to the client device 102 and the operation is aborted. Any successfully stored fragments are removed from their providers 108 and/or volumes 134, 136, 138, 140 and all data about the file version is removed from the database.

Note: in the case of a failure to write to a provider 108 and/or volume 134, 136, 138, 140, the storage manager 104 re-allocates the fragment to the next available provider 108 and/or volume 134, 136, 138. 140 (and indicates this to the client device 102). If no more volumes 108 and/or volumes 134, 136, 138, 140 are available for the fragment, this constitutes a critical failure.

In an example, to archive a file (i.e. backup the file to a remote storage provider 108 and/or remote storage volumes 134, 136, 138, 140) and then remove the source file from the client device 102), a user can right-click on the file and select "Archive" (or similar) from the context menu. The same process is followed as per backing up (above), but at the end of the process, the original source file is removed from the client device 102 and may be replaced on the client device 102 with a relatively smaller file representing the archived file (which may be associated with the client software). This replacement file may contain sufficient information to identify uniquely the original source file stored with the remote storage provider 108 and/or remote storage volume 134, 136, 138, 140, should the file need to be restored.

In an example, to restore a file from a backup a user can either right-click on the file and click "Restore" (or similar) from the context menu (picking a version number if more than one version exists), or—in the case of an archived file—double-click on the replacement file. This causes the reverse of the Backup process to occur—a File Restore session is started on the storage manager 104 and each fragment is retrieved and its checksum verified, re-constructing the original file. When complete, any existing file is renamed and the restored file put in its place, notifying the user of progress as appropriate. The user can also or alternatively retrieve any archived or backed-up file via a web interface described below. This can include a "download" option to retrieve any archived file version via the web browser. In an example, a web interface can include an interface for a mobile client device 102 which can be accessible using a locally installed app for example, or via a mobile specific browser.

Example Web Services

The storage manager 104 may, in embodiments, comprise a custom collection of web services which can be run on a Linux server, for example, connecting to a configuration database implemented with MySQL, for example. The default configuration of the storage manager 104 may be a single instance on a single server, which also hosts a single-instance configuration database (the data management store 112 being implemented on the same server in this embodiment—as well as some others). Alternatively, the storage manager 104 and data management store 112 may be implemented on separate servers. Other modules and components of the storage system 100 may also be implemented on the same server—such as the keystore 118, and/or data management layer 107, and/or the monitoring module 120)

In an example, a number of web services are available for use by one or more applications of the client device 102. More specifically, a CLIENT_LOGIN message can be sent by the client device 102 to the server to initiate a login session, and includes the user identifier (such as a ID or username), client device identifier (such as a machine name) and password/private key. If the login is successful, a session token is returned to the client device 102 from the server for use in subsequent transactions. Otherwise a failure message is returned to the client device 102. A CLIENT_LOGOUT message is sent by the client device 102 to the server to terminate a login session. This message causes the storage manager 104 (and/or the authentication module 114 if provided) on the server to invalidate the current session token. A success code is returned to the client device 102 from the server.

A CLIENT_HEARTBEAT message is sent by the client device 102 to the server once every five minutes (or other predetermined period) to indicate that a user session still exists. In the event of the user session being closed without the client device 102 sending a CLIENT_LOGOUT message to the server, the server will wait for ten minutes (or other predetermined period) without receipt of a CLIENT-_HEARTBEAT message, prior to invalidating the current session token. A CLIENT_INIT_BACKUP message is sent by the client device 102 to the server to initialise the backing up or archiving of a file. Data supplied includes the session token, machine name (or other client device identifier), full file path, and file size, and may include a flag indicating BACKUP or ARCHIVE and any other options specific to the backup (e.g. a particular preference order). If the request is accepted, the storage manager 104 returns a backup request token and a list of fragment offsets and sizes (the fragment offsets representing the portions of the file forming each fragment). This information is used by the client device 102 to send the file to the storage manager 104. If the request is not accepted, a failure message is returned by the server to the client device 102, containing details of the failure. A CLIENT_PUT_FRAGMENT message is sent by the client device 102 to deliver a single fragment of a file to the storage manager 104 as part of the backup sequence. Data supplied includes the session token, machine name (or other client machine identifier), full file path, the backup request token (returned in the CLIENT_INIT_BACKUP response), the fragment number, the fragment data and a checksum. The storage manager 104 uses this data to initiate a transfer to the appropriate remote storage provider 108 and/or remote storage volume 134, 136, 138, 140 using the associated API or (in the case of a custom agent) the AGENT_PUT_FRAGMENT message. A success response is returned to the client device 102 from the server. A CLIENT_INIT_RESTORE message is sent by the client device 102 to the server to request a restore of a particular file. The message includes data such as the session token, machine name (or other client machine identifier), full file path, and optionally a specific version (or "LATEST"). If no version is supplied in the message, the storage manager 104 returns a response containing a list of available versions. The client device 102 uses this information to request a specific version from the user, and then issue another CLIENT_INIT_RESTORE request to the server. If a version is supplied, the storage manager 104 responds with a restore request token and a list of fragment offsets and sizes. This information is subsequently used by the client device 102 to request a file from the storage manager 104. If the request is not accepted, a failure message is returned, containing details of the failure.

A CLIENT_GET_FRAGMENT message is sent by the client device 102 to request a single fragment of a file from the storage manager 104, as part of a restore sequence. Data supplied includes the session token, machine name (or other client machine identifier), full file path, the restore request token (returned in the CLIENT_INIT_RESTORE response) and the fragment number. When the storage manager 104 receives the request, it identifies the location(s) where the fragment is stored, and retrieves the encrypted fragment data from the remote storage provider 108 and/or the remote storage volume 134,136,138,140 marked as the highest priority, using either the associated API or, in the case of a custom agent, via a AGENT_GET_FRAGMENT message. If any fragment fails to be retrieved by the storage manager 104 after three retries, the remote storage provider 108 and/or the remote storage volume 134, 136, 138, 140 is marked as offline in the configuration database. If any other copies exist of the fragment, the storage manager 104 attempts to retrieve it from the next available remote storage provider 108 and/or the remote storage volume 134, 136, 138, 140. If the fragment could not be successfully retrieved from any of the remote storage provider 108 and/or the remote storage volume 134, 136, 138, 140, an error is returned to the client device 102. Otherwise, details of the remote storage providers 108 and/or the remote storage volumes 134, 136, 138, 140 from which fragments could not be retrieved are returned in the response message (the client device 102 can display this information to the user to allow him or her to make a decision as to whether to make an additional copy of the file for further resilience).

In order to maintain a healthy range of storage remote storage providers 108 and/or the remote storage volumes 134, 136, 138, 140, and also to rank remote storage providers 108 and/or the remote storage volumes 134, 136, 138, 140 in terms of speed of response and uptime, the storage manager 104 may periodically checks the responsiveness of each remote storage provider 108 and/or the remote storage volume 134, 136, 138, 140 by transmitting a small file to it in an example. This is done in the same way as when storing a data fragment—either through the associated API, or by sending the AGENT_PUT_FRAGMENT message to the appropriate custom agent. If the data fragment cannot be stored, the remote storage provider 108 and/or the remote storage volume 134, 136, 138, 140 is marked as offline in the configuration database. If the remote storage provider 108 and/or the remote storage volume 134, 136, 138, 140 has been offline for more than a predetermined maximum time period, it is flagged as requiring manual intervention via the administration interface. If the data fragment was stored successfully, the elapsed time between initiation of the fragment storage and receipt of the response message is stored in the configuration database for use in remote storage provider ranking. In other embodiments, the monitoring module 120 provides feedback information to the data management store 112 for access by the storage manager 104.

Agent Services

According to examples, agent services handle requests for storing and retrieving file fragments. In the case of supported web storage, the storage manager 104 corresponds with these agents using specific API requests defined by the remote storage provider 108. Any details needed to issue these requests (e.g. authentication keys) are stored alongside the remote storage provider record in the configuration database (within the data management store 112).

Where an area of raw disk storage is available (for example in the form of a storage area network (SAN) on a company network, or on hosted webspace on the internet), a custom storage agent can be used to handle storage and retrieval of file fragments. In an example, the storage agent is a small web server which can be installed on any Linux system (for example)—physical or virtual—which has access to the disk storage. Alternatively, the agent is available as a standalone machine image, based around a very small Linux (for example) installation. If required, the agent can be scaled up to provide higher availability by running multiple instances of the standalone version in a cluster, using Linux High Availability services (for example). However, it should be noted that the use of non-standard storage should normally be considered as a secondary option after one of the cloud storage systems, which will inevitably provide more resilience due to their design and scale.

In an example, communication is initiated by the storage manager 104. The storage manager 104 uses a private key stored within the data management store 112 to call a specific web service on the Custom Storage Agent, which verifies the authenticity of the key and processes the receipt or transmission of file data. The storage manager 104 stores a file fragment by sending an AGENT_PUT_FRAGMENT message to the appropriate custom storage agent. This message includes a unique identifier for the file fragment and a SHA-1 checksum (or other checksum). A handler application re-calculates the checksum and verifies it against the one supplied. If it matches, the fragment is stored away and a success response is returned to the storage manager 104. If the operation is unsuccessful, a failure code is returned to the storage manager 104. In the case of a checksum failure, this causes the storage manager 104 to retry the request a maximum of three times (for example). If the checksum fails after all retries, if the storage manager 104 receives any other failure code, or if the custom storage agent did not respond in a predetermined period, the storage location holding the file fragment is marked as failed within the configuration database and the storage manager 104 stops attempting to store the fragment in that storage location.

In an example, the storage manager 104 retrieves a fragment by sending an AGENT_GET_FRAGMENT message to the custom storage agent. This message includes a unique identifier for the file fragment. The handler application retrieves the file fragment, and calculates a checksum for the data. It then responds to the storage manager 104 with the file fragment and checksum. The storage manager 104 then re-calculates the checksum. If the checksum fails to match, the storage manager 104 re-sends the AGENT_GET_FRAGMENT message a maximum of three times (for example). If the checksum fails after all retries, if the storage manager 104 receives some other failure code, or if the custom storage agent did not respond in time, the storage location holding the file fragment is marked as failed within the configuration database and the storage manager 104 stops attempting to retrieve fragments from this storage location.

System Tray Application

In an example, client device 102 components can comprise a "system tray" application (which handles session management, authentication and user preferences), and an integrated context menu which provides backup and restore options to the user. Such a tray application runs when a user logs in to the client device 102. By default, the user will typically be logged in automatically to the storage manager 104 whenever a desktop session is established (or, if required, the user can opt to authenticate to the server manually on the first use of the functionality within a login session), using a CLIENT_LOGIN message. This contains a username, machine name (or other client device identifier) and one or both of the password and private key. If authentication is successful, the storage manager 104 returns a unique session token for use in subsequent transactions.

Otherwise, a failure message is returned. Until successful authentication has taken place, all other operations are unavailable.

When the user logs out of the client device 102, the tray application sends a CLIENT_LOGOUT message to the storage manager 104, containing the username, machine name (or other client device identifier) and the session token. This causes the storage manager 104 to delete the session information, rendering the session token no longer valid. In an example, the client device 102 can send a CLIENT_HEARTBEAT message to the storage manager 104 every five minutes (for example), to maintain the session token. If this message is not received within ten minutes (for example), the storage manager 104 will mark the session as invalid. If this occurs during a user session and the user subsequently attempts a backup or restore operation, the storage manager 104 will respond to any messages with a request to re-authenticate. The tray application will then perform re-authentication (prompting the user, if appropriate), prior to the operation being retried. The tray application also makes available a settings dialog (for setting user preferences, including the level of information to display while performing backups or restores) and an option to run a scheduled backup of one or more files in the background.

In addition to the functionality detailed above, the tray application is also capable of generating alerts, in the form of a change to the tray icon (superimposing it with an exclamation mark for example) and an information "balloon". The level of alert generation is configurable by the user, but might include information on the health of the connection to the storage manager 104, changes to the accessibility/integrity of backed-up fragments, maintenance notices etc.

A number of options are provided to the end user via a context menu according to an example, and which is displayed when a user right-clicks for example on a file upon which an operation is required. One or more of the following options may be available:

Backup—this option initiates the backing up of the selected file with the flag set to BACKUP.
Archive—this option initiates the archiving of a file (i.e. its backup and subsequent replacement of the file) with the flag set to ARCHIVE.
Restore Latest—this option initiates the restoration of the latest version of the appropriate file with the version set to LATEST.
Restore Version—this option causes a CLIENT_INIT_RESTORE message to be sent to the storage manager 104, with the version number null. The list of available versions returned from the storage manager 104 can be displayed to the user in a dialog box. The user may either choose to select one of the version numbers for restoration, or to cancel the operation. If a version is selected, the CLIENT_INIT_RESTORE message is again sent, this time with the version number set to the appropriate version.

Subject to the user's preferences, a dialog box may be displayed while the appropriate operation is being carried out. This will provide a graphical representation of the progress of the operation.

A system management console may be provided by the administration server 142 and may be accessed via a web browser. The system management console provides a range of functionality, dependent upon the role of the user. The functionality available can be broadly divided into three user areas, which are described in the following sections.

In an example, individual users with a client device 102 configured to provide backup and storage functionality have access to the system management console as an end user via a login to a website provided by the administration server 142. Options available to end users include one or more of:
Changing personal details associated with a user, such as email addresses, passwords etc;
Generating their own key pairs for client-server authentication;
Downloading the client software;
Associating a user with an organisation, e.g. a corporate entity;
Manually retrieving backed-up files;
Defining remote storage provider 108 or remote storage volume 134, 136, 138, 140 orders of preference; and
Viewing logs of their own activities.

One or more users may be power users who have the ability, and are provided the requisite facilities, to manage other users' accounts as well as their own. Options available to power users include all the options for regular end users, but they may be carried out on any user.

One or more users may be system administrators who have the ability, and are provided with the requisite facilities, to manage all user accounts in the same way as power users, but also to carry out fundamental operations affecting the entire storage system 100. These options can include one or more of:
Adding or removing new remote storage providers 108 and/or remote storage volumes 134,136,138,140;
Installing and configuring custom agents;
Taking down or starting up the system 100 (or components thereof);
Making the administration interface unavailable/available;
Generating authentication keys for storage manager 104-agent communications;
Set organisation;
Associating users with an organisation, e.g. a corporate entity;
Viewing all logs, including security logs; and
Database administration activities.

In embodiments, in addition to the activities listed above, system administrators can also receive system alerts via email, SMS messaging or social media and RSS feeds e.g. Twitter. These can be inspected by logging in to the system management console, and include alerts generated by failures of storage areas, storage space nearing capacity, and other critical system messages.

In addition to providing backup services, the system and methods described herein can also support a number of other functions. For example, it is possible to modify the client software so that after it compresses a file during a backup operation, it creates a RAID 5 image of the file prior to transmission. In such embodiments, the backup request message may include a flag indicating that the file supports RAID 5. The storage manager 104 stores this information in the configuration database for use in the event of a subsequent retrieval failure. In the event that one of the file fragments fails to be retrieved, the storage manager 104 can return only the recovered fragments, along with an indication of the failure. The client software can then use the additional RAID data in the retrieved fragments to reconstruct the original file, despite the failure. In an example, other levels of RAID could also be appropriate. For example, RAID 1 (mirroring) and RAID 10 (mirroring and striping) can be used. Other suitable redundancy schemes can be used as desired.

Furthermore, implementation of a storage system 100 can be achieved by automating the storage and retrieval process at session login and logout. The same individual file backup and restore operations would be carried out as described in the previous section, but in the background and without user interaction.

In an example, a Content Delivery Network can be provided by modifying the client device 102 for use by a content publisher. For example, for content delivery, files need not be fragmented or encrypted prior to storage and each file can be written into multiple storage locations (i.e. to multiple remote storage providers 108 and/or to multiple remote storage volumes 134, 136, 138, 140). A content server can be allocated to handle each storage location and a management server can use a dynamic name resolution system to switch between available content servers, in the event of a server being lost.

An option can be added to the client software whereby the user provides the name of a client device 102 (or other client device identifier) which has been lost, stolen or suffered a critical failure and the storage manager 104 may use this request to retrieve the specified client device's 102 entire file set to the calling client device 102 (potentially subject to verification of the user/client device combination). Optionally, the calling client device 102 can also request to "take over" this file set, which will cause the storage manager 104 to re-label all files currently stored for the old client device 102 as belonging to the new one.

Example System Apparatus

Figure 3:
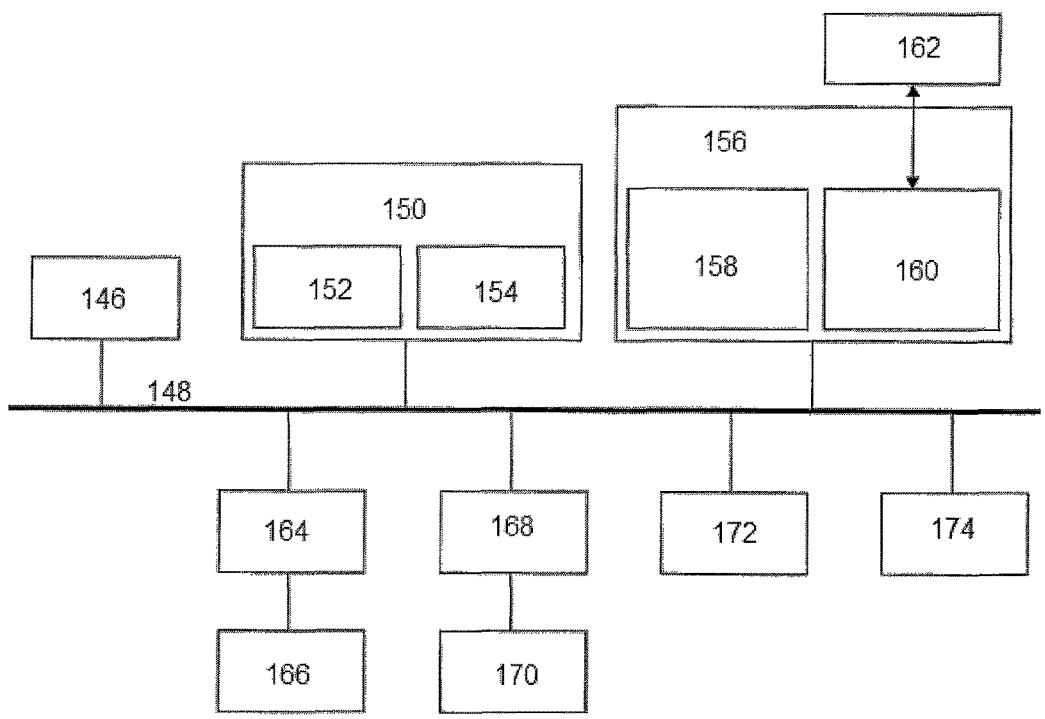
FIG. 3 is a schematic block diagram of a system according to embodiments of the invention.

FIG. 3 is a schematic block diagram of a system according to an example, and which is suitable for implementing any of the systems, methods or processes described above. The apparatus of the depicted system includes a processing device 146 comprising one or more processors, providing an execution platform for executing machine readable instructions such as software.

Commands and data from the processing device 146 are communicated over a communication bus 148. The system also includes a main memory 150, such as a Random Access Memory (RAM), where machine readable instructions may reside during runtime, and a secondary memory 156. The secondary memory 156 includes, for example, a hard disk drive 158 and/or a removable storage drive 162, representing a floppy diskette drive, a magnetic tape drive, a compact disk drive, etc., or a non-volatile memory where a copy of the machine readable instructions or software may be stored. The secondary memory 156 may also include ROM (read only memory), EPROM (erasable, programmable ROM), EEPROM (electrically erasable, programmable ROM).

In addition to software, data representing any one or more of data fragments of files and/or private-public key pairs, for example, may be stored in the main memory 150 and/or the secondary memory 156. The removable storage drive 162 reads from and/or writes to a removable storage unit 160 in a well-known manner.

A user can interface with the depicted system with one or more input devices 164, such as a keyboard, a mouse, a stylus, a touch screen device and the like in order to provide user input data for example. The display adaptor 168 interfaces with the communication bus 148 and a display 170, and receives display data from the processing device 146 and converts the display data into display commands for the display 170. A network interface 172 is provided for communicating with other systems and devices via a network such as network 102 for example. The depicted system can include a wireless interface 174 for communicating with wireless devices.

It will be apparent to one of ordinary skill in the art that one or more of the components of the depicted system may not be included and/or other components may be added as is known in the art. The system shown in FIG. 3 is provided as an example of a possible platform that may be used, and other types of platforms may be used as is known in the art.

One or more of the steps described above may be implemented as instructions embedded on a computer readable medium and executed on the system. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which includes storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or another network. Concrete examples of the foregoing include distribution of the programs on a CD ROM or via Internet download. The same is true of computer networks in general. It is therefore to be understood that those functions enumerated above may be performed by any electronic device capable of executing the above-described functions.

The system of FIG. 3 can be in the form of mobile device such as a smart device in the form of a mobile telephone or tablet computing device for example. It is typical to interface with such devices using a touch enabled interface in which a user can interact with various icons and other graphical elements by touch gestures via a display of the device. In an example, a typical "long press" touch gesture on graphical element representing a folder or file can be used to present a user with an option to include this in their backup. Other alternatives are possible. For example, other suitable gestures can be used to invoke a backup option.

According to an example, a storage backup manager 152 can reside in memory 150 and operate on data from input sources. Further, a preference file 154 can reside in memory 150.

A method of storing data, using a system such as that described in relation to FIG. 2, is as follows. A local file stored on a client device 102 which is to be backed-up is selected. For example, a context menu can be invoked (by right clicking the file for example) in which the file is selected by a user for backup. Alternatively, a scheduled backup can be maintained by a system in which certain files or the contents of certain storage locations are periodically backed-up, in which case no user selection need occur other than an initial selection of a file or location to be backed-up on a scheduled basis.

The selected file is then encoded into multiple fragments. For example, as described above, a file can be segmented into multiple fragments so that it can later be reconstructed, such as when it is restored to its original location. The multiple fragments are transmitted from the client device 102 via the storage manager 104 to a plurality of remote storage volumes 134,136,138,140 and/or remote storage providers 108. The remote storage volumes 134,136,138, 140 and/or remote storage providers 108 can also include a network attached storage location 144 and/or third party cloud storage services for example. The storage manager 104 may form an integral part of the client device 102 or may be a separate entity connected via a network connection, for example. The storage manager 104 and/or client device(s) 102 are in communication with an administration server 142, which provides the facilities and functionality of the data management layer 107 of the system of FIG. 1. In other words, the administration server 142 may provide storage strategy, authentication, and administration functionality to the client device 102 and storage manager 104.

A mobile terminal such as a mobile telephone or smart phone may be used to initialise the data transfer, for example. In other examples, a PDA or tablet computing device might be used. Other alternatives are possible. In some examples, the device includes a touch-sensitive display system. The touch-sensitive display system is sometimes called a "touch screen" for convenience. In other examples, a display system can include a non-touch sensitive display such as an LCD or LED display for example. The device may include a memory which may include some or all of: one or more computer readable storage mediums, a memory controller, one or more processing units (CPU's), a peripherals interface, RF circuitry, audio circuitry, a speaker, an input/output (I/O) subsystem and other input or control devices. These components may communicate with other components of the system over one or more communication buses or signal lines.

It should be appreciated that the device described above is only one example of a suitable device, and that the device may have more or fewer components, and may combine two or more components. The various components may be implemented in hardware, software or a combination of both hardware and software, including one or more signal processing and/or application specific integrated circuits for example.

The device memory may include high-speed random access memory and may also include non-volatile memory, such as one or more magnetic disk storage devices, flash memory devices, or other non-volatile solid-state memory devices. Access to memory by other components of the device, such as the CPU and the peripherals interface, may be controlled by the memory controller.

The peripherals interface couples the input and output peripherals of the device to the CPU and memory. The one or more processors run or execute various software programs and/or sets of machine readable instructions stored in the memory to perform various functions for the device and to process data.

In some embodiments, the peripherals interface, the CPU, and the memory controller may be implemented on a single chip. In some other embodiments, those components may be implemented on separate chips.

The device may include RF (radio frequency) circuitry that receives and sends RF signals. The RF circuitry converts electrical signals to/from electromagnetic signals and communicates with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may communicate with networks, such as the Internet, an intranet and/or a wireless network, such as a cellular telephone and/or data network, a wireless local area network (LAN), and other devices by wireless communication. The wireless communication may use any of a plurality of typical communications standards, protocols and technologies.

Audio circuitry and a speaker provide an audio interface between a user and the device. The audio circuitry receives audio data from the peripherals interface, converts the audio data to an electrical signal, and transmits the electrical signal to the speaker. The speaker converts the electrical signal to human-audible sound waves. Audio data may be retrieved from and/or transmitted to memory and/or the RF circuitry by the peripherals interface. In some examples, the audio circuitry also includes a headset jack. The headset jack provides an interface between the audio circuitry and removable audio input/output peripherals, such as output-only headphones or a headset with both output (e.g. a headphone for one or both ears) and input (e.g. a microphone).

The I/O subsystem couples input/output peripherals on the device, such as the touch screen and other input/control devices, to the peripherals interface. The I/O subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, joysticks, click wheels, trackpads, touch interface devices and so forth. In some alternate embodiments, input controller(s) may be coupled to any (or none) of the following: a keyboard, infrared port, USB port, and a pointer device such as a mouse. The one or more buttons may include an up/down button for volume control of the speaker. The one or more buttons may include a push button or slider control. The touch screen can be used to implement virtual or soft buttons or other control elements and modules for a user interface for example.

In some example, software components stored in memory may include an operating system, a communication application (or set of instructions), a contact module (or set of instructions), a graphics module (or set of instructions), a GPS module and a text input module.

The communication application facilitates communication with other devices over one or more external ports. The contact/motion module may detect contact with the touch screen and other touch sensitive devices (e.g., a touchpad or physical click wheel). The contact module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., multiple finger contacts). Various touch gestures can be used to invoke backup options and operations. For example, a user touching an icon or other element can invoke selection of an application which can be used to back up a file or folder. Another suitable touch gesture can include a "long hold" in which a user touches an icon or other element and does not stop touching it until a contextual menu (for example) appears. Such a menu can include multiple options for backup such as including selecting a file to be backed up, a location and a backup parameter such as a number of backup locations for example.

The graphics module includes various known software components for rendering and displaying graphics on the touch screen, including components for changing the intensity of graphics that are displayed. As used herein, the term "graphics" includes any object that can be displayed to a user, including without limitation text, icons (such as user-interface objects), digital images, videos, animations and the like.

A GPS module can determine the location of the device and provide this information for use in various applications (e.g., for use in location-based dialing, for a camera etc. The GPS module can determine the current location of the device for use in determining the most proximate backup centre for example.

The text input module, which may be a component of the graphics module, can provide a soft keyboard for entering text in various applications for the device. For example, a soft keyboard can be used by a user to provide textual input relating to answers to questions posed to the user, such as questions relating to an object to be backed up and a backup location(s), or for the determination of other information which can be used to verify or authenticate the user so that information for or about them can be provided and/or retrieved.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, an administration module may be combined with an authentication module into a single module. In some examples, the memory may store a subset of the modules and data structures identified above. Furthermore, the memory may store additional modules and data structures not described above.

Since the storage configuration data may include geographical data, the storage strategy may include consideration of geographical constraints and/or preferences. For example, the storage strategy configuration module may use an algorithm for location based services, e.g. to distribute a certain data type that contains personally identifiable data only within territories within the European Union, or data centres that comply with Safe Harbor agreements. Other location rules could be set on the basis of geographic location such as avoiding data storage facilities in earthquake prone areas (e.g. do not allow more than one service provider in an array of providers to be in an earthquake prone area). Furthermore, political considerations may be taken into account, such as not to allow more than one data centre to be located in a particular territory.

It is possible to use a system and method as described herein to underpin a resilient content delivery network (CDN), allowing location-independent delivery of streaming content (such as media content including music and/or video files, for example). This is achievable using mirroring techniques to distribute copies of files or fragments across multiple remote storage volumes 134, 136, 138, 140 and/or remote storage providers 108. For example, a dynamic name resolution system may be used to redirect an apparently static request URL to the most appropriate copy of the required content. Combined with multiple content servers behind a virtual IP address, this can enable (potentially seamless) recovery in the event of loss of a data store, a server, or both.

Remote Storage Communication Provider

In an embodiment, where the remote storage communication layer 106 is provided as a component remote from a storage manager 104 (and storage system 100), it may provide a communication interface between multiple storage managers 104 (corresponding to multiple storage systems 100) and the remote storage providers 108 and/or remote storage volumes 134, 136, 138, 140. It is envisaged that unrelated businesses may each operate their own remote storage systems, each comprising a respective storage manager 104 to send and receive fragments of data to the remote storage providers 108 and/or remote storage volumes 134, 136, 138, 140.

The remote storage communication layer 106 may maintain a separate storage manager 104, data management store 112, and storage strategy configuration module 116. In this way, the remote storage communication layer 106 may distribute the data it receives from the storage managers 104 according to settings and information provided by the respective system comprising that storage manager 104. In other words, a user may set preferences and rules for how the data is to be treated, in common with the system 100 herein described, those rules and preferences being communicated (either as general settings, or in relation to the data being stored) to the remote storage communication layer 106. The remote storage communication layer 106 acts accordingly, forwarding the data to an appropriate remote storage provider 108, to meet the specified requirements of the originating storage manager 104, whilst making its own decisions regarding the particular remote storage provider 108 and/or remote storage volume 134, 136, 138, 140 to which to send the data.

A system according to such embodiments enables a further layer of optimisation and efficiency to be introduced. For example, a provider of a remote storage communication layer 106 may be able to apply economies of scale to purchase or hire remote storage of various types. That provider may receive instructions and settings from a plurality of different client systems (e.g. each system belonging to a different organisation and potentially including a plurality of client devices 102), each having a storage manager 104 responsible for overseeing remote storage and retrieval of data. The individual client devices 102 or client systems specify only their requirements for the type and properties of the storage, and do not choose a particular remote storage provider 108 or remote storage volume 134, 136, 138, 140. By combining the data storage requirements of multiple organisations' systems in this way, the remote storage communication layer 106 may be able to use the purchased or hired remote storage volumes in a more efficient manner. For example, if four client systems each require 10 TB of high security, high expense, remote storage, each could hire a minimum allowed volume of 20 TB to store its data, resulting in only 50% of the volume being used. Alternatively, the provider may make use of a single volume of 50 TB to accommodate the storage requirements of all four, for example, resulting in a higher efficiency of 80%.

Since the data provided to the remote storage communication layer 106 has already been compressed, fragmented, and encrypted with the private key associated with a user or client device 102 by the storage manager 104 of the respective client system, the fragments of data it receives are substantially secure. Similarly, the data forwarded by the remote storage communication layer 106 to the remote storage providers 108 remains secure, even though the data may belong to different client systems. Neither the remote storage provider 108 nor the remote storage communication layer 106 has the ability or facility to access the data without the encryption keys and storage strategy plans stored by the respective storage managers 104.

Distributed Data Processing

While the system has been described in relation to a storage system 100, or backup system 100, the system 100 can also be applied to the provision of data processing. For example, the remote storage providers 108 may provide (in addition to, or instead of purely providing pure 'storage' facilities) data processing facilities. In this way, data may be fragmented and distributed across multiple data centres for processing, and subsequent recombination. Significant bandwidth data interconnects may not be required to implement such a distributed processing system.

'Files'

The term 'file' has been used herein to refer to data which is stored electronically on a computer readable medium. The file may or may not be a self-contained unit as such and may, in fact, form a part of a larger file or may be a compressed version of a larger file. The file may require additional data before it can be opened by a suitable application. The file may be a data file—containing information—or may be an application file—such as an executable—or may be any other type of file (or part thereof). The term 'file' as used herein should be interpreted accordingly.

'Remote Storage Volumes'

The term 'remote storage volume' is not intended to be limited to a particular isolated storage device. In embodiments, the remote storage volumes 134, 136, 138, 140 may be hosted by the same remote storage provider 108, in a single datacentre. The remote storage volumes 134, 136, 138, 140 may be provided on separate storage devices or may reside on a single storage device. In embodiments, the remote storage volumes 134, 136, 138, 140 may be hosted on different datacentres maintained by the same remote storage provider 108, which may be hosted in different availability zones and/or regions.

In other embodiments, each remote storage volume 134, 136, 138, 140 is hosted by a different remote storage provider 108 (i.e. by different cloud storage service providers).

In embodiments, a file is encoded into a plurality of fragments, and the fragments are sent to remote storage volumes 134, 136, 138, 140 hosted by at least three different remote storage providers 108. In other embodiments, the fragments may be sent to at least three remote storage volumes 134, 136, 138, 140 each hosted in a different availability zone, wherein the storage volumes are hosted by a single service provider 108.

Distributed Data Redundancy

A storage system 100 according to embodiments of the invention can be used to store a complete set of data to each of at least two remote storage volumes 134, 136, 138, 140, so as to provide distributed data redundancy. Instead of, or in addition to, fragmenting files prior to transmission from the storage manager 104, each file (or fragment) may be sent to at least two of the remote storage volumes 134, 136, 138, 140. In this example, the remote storage volumes 134, 136, 138, 140 may be hosted by remote storage providers or may be hosted in different zones by a common remote storage provider.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of storing data utilizing a storage manager, the method comprising:
   encoding a file into a plurality of fragments;
   retrieving storage configuration data from a data management store including data associated with a plurality of remote storage volumes, the storage configuration data including an indication of a predefined data transmission size corresponding to each of the plurality of remote storage volumes;
   using the storage configuration data to identify a storage strategy associating each fragment of the plurality of fragments with one of the plurality of remote storage volumes, wherein using the storage configuration data includes using the indications of the predefined data transmission sizes;
   packaging one or more fragments of the plurality of fragments to form a data bundle, each fragment of the one or more fragments of the plurality of fragments being associated with a common identified remote storage volume as identified by the storage strategy;
   encrypting each fragment of the one or more fragments of the plurality of fragments, the encrypting of each fragment of the one or more fragments of the plurality of fragments including:
      retrieving encryption key data from a keystore, the keystore being in communication with the storage manager, wherein the keystore has no direct communication with the data management store;
      using the encryption key data to identify a first encryption key associated with a user;
      encrypting at least one fragment of the one or more fragments of the plurality of fragments using the first encryption key;
      using the encryption key data to identify a second encryption key associated with the common identified remote storage volume identified in the storage strategy; and
      encrypting the at least one fragment of the one or more fragments of the plurality of fragments using the second encryption key,
      wherein the encrypting of the at least one fragment of the one or more fragments of the plurality of fragments using the first encryption key occurs before the packaging of the one or more fragments of the plurality of fragments to form the data bundle, and
      wherein the encrypting of the at least one fragment of the one or more fragments of the plurality of fragments using the second encryption key occurs after the packaging of the one or more fragments of the plurality of fragments to form the data bundle, such that the data bundle is encrypted using the second encryption key;
   communicating the data bundle to the common identified remote storage volume associated with the one or more fragments of the plurality of fragments in the data bundle;
   storing the one or more fragments of the plurality of fragments at the common identified remote storage volume; and
   storing the one or more fragments of the plurality of fragments at a local storage volume using a custom storage agent.

2. The method according to claim 1, further comprising:
authenticating a client device session by:
receiving a user identifier and password from the user;
identifying whether the received password matches a password associated with the user stored in the data management store, and if so, identifying whether an identifier associated with a client device matches a client device identifier stored in the data management store; and
returning a session token to the client device if the authenticating of the client device is successful, and otherwise not returning the session token to the client device.

3. The method according to claim 1, wherein the identifying of the storage strategy using the storage configuration data includes identifying the storage strategy using one or more of the following data: total data capacity, used capacity, spare capacity, response speed, provider pricing information, upload transfer size limit, data transmission sizes, bandwidth capacity, volume availability, historical volume availability, advertised data transfer rates, advertised data volume breaks, historical observed data transfer rates, historical volume performance data, historical provider performance data, user-defined volume preferences, geographic location, volume security level, and provider security level.

4. The method according to claim 1, further comprising:
monitoring a performance of at least one of the plurality of remote storage volumes;
communicating performance information to the data management store; and
updating the storage configuration data at the data management store.

5. The method according to claim 1, further comprising receiving an indication that the data bundle has been successfully stored at the common identified remote storage volume.

6. The method according to claim 1, wherein the retrieving from the data management store of the storage configuration data includes retrieving from the data management store storage plans for storing and reconstituting fragmented files.

7. The method according to claim 1, wherein the encoding of the file into the plurality of fragments includes first compressing the file.

8. The method according to claim 1 further comprising:
storing redundant array of inexpensive disks (RAID) data using the storage manager.

9. A storage system comprising:
a storage manager having a processor and a memory, the storage manager having access to a data management store storing storage configuration data and a keystore storing encryption keys, the keystore being in communication with the storage manager, wherein the keystore has no direct communication with the data management store, and the storage manager is operable to:
encode a file into a plurality of fragments;
retrieve the storage configuration data from the data management store including data associated with a plurality of remote storage volumes, the storage configuration data including an indication of a predefined data transmission size corresponding to each of the plurality of remote storage volumes;
use the storage configuration data to identify a storage strategy associating each fragment of the plurality of fragments with one of the plurality of remote storage volumes, wherein using the storage configuration data includes using the indications of the predefined data transmission sizes;
package one or more fragments of the plurality of fragments to form a data bundle, each fragment of the one or more fragments of the plurality of fragments being associated with a common identified remote storage volume as identified by the storage strategy; and
encrypt each fragment of the one or more fragments of the plurality of fragments, the encryption of each fragment of the one or more fragments of the plurality of fragments including:
retrieving encryption key data from the keystore;
using the encryption key data to identify a first encryption key associated with a user;
encrypting at least one fragment of the one or more fragments of the plurality of fragments using the first encryption key;
using the encryption key data to identify a second encryption key associated with the common identified remote storage volume identified in the storage strategy; and
encrypting the at least one fragment of the one or more fragments of the plurality of fragments using the second encryption key,
wherein the encrypting of the at least one fragment of the one or more fragments of the plurality of fragments using the first encryption key occurs before the packaging of the one or more fragments of the plurality of fragments to form the data bundle, and
wherein the encrypting of the at least one fragment of the one or more fragments of the plurality of fragments using the second encryption key occurs after the packaging of the one or more fragments of the plurality of fragments to form the data bundle, such that the data bundle is encrypted using the second encryption key; and
communicate the data bundle to the common identified remote storage volume associated with the one or more fragments of the plurality of fragments in the data bundle; and
a local storage volume operable to store the one or more fragments of the plurality of fragments using a custom storage agent.

10. The system according to claim 9, further comprising a client device operable to transmit the file to the storage manager, and operable to initiate storage of the file by the storage manager.

11. The system according to claim 9, wherein the storage manager is further operable to compress the file before encoding the file into the plurality of fragments.

* * * * *